United States Patent
Suzuki et al.

(10) Patent No.: US 9,074,879 B2
(45) Date of Patent: Jul. 7, 2015

(54) INFORMATION PROCESSING APPARATUS AND INFORMATION PROCESSING METHOD

(71) Applicant: CANON KABUSHIKI KAISHA, Tokyo (JP)

(72) Inventors: Tatsuya Suzuki, Tokyo (JP); Tetsuri Sonoda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 84 days.

(21) Appl. No.: 13/774,168

(22) Filed: Feb. 22, 2013

(65) Prior Publication Data

US 2013/0229666 A1 Sep. 5, 2013

(30) Foreign Application Priority Data

Mar. 5, 2012 (JP) ................................. 2012-048610

(51) Int. Cl.
| | |
|---|---|
| G01B 11/24 | (2006.01) |
| G01B 9/08 | (2006.01) |
| G01B 11/25 | (2006.01) |
| G01B 11/30 | (2006.01) |
| G01B 11/02 | (2006.01) |

(52) U.S. Cl.
CPC .............. *G01B 11/25* (2013.01); *G01B 11/026* (2013.01)

(58) Field of Classification Search
USPC ..................... 356/237.1–241.6, 242.1–243.8, 356/426–431, 600–640
See application file for complete search history.

(56) References Cited

U.S. PATENT DOCUMENTS

| | | | | |
|---|---|---|---|---|
| 4,653,104 | A * | 3/1987 | Tamura | 382/154 |
| 6,549,289 | B1 * | 4/2003 | Ellis | 356/603 |
| 6,970,600 | B2 * | 11/2005 | Abe | 382/187 |
| 7,236,256 | B2 * | 6/2007 | Yamaguchi | 356/603 |
| 7,583,391 | B2 * | 9/2009 | Lu | 356/601 |
| 8,384,911 | B2 * | 2/2013 | Nomura et al. | 356/610 |
| 8,538,166 | B2 * | 9/2013 | Gordon et al. | 382/201 |
| 2003/0123707 | A1 * | 7/2003 | Park | 382/106 |
| 2005/0254066 | A1 * | 11/2005 | Mamiya et al. | 356/604 |
| 2009/0221874 | A1 * | 9/2009 | Vinther et al. | 600/178 |
| 2012/0176478 | A1 * | 7/2012 | Wang et al. | 348/47 |
| 2013/0076896 | A1 * | 3/2013 | Takabayashi et al. | 348/136 |

FOREIGN PATENT DOCUMENTS

| | | |
|---|---|---|
| JP | 2009-517634 A | 4/2009 |
| WO | 2007/059780 A1 | 5/2007 |

* cited by examiner

*Primary Examiner* — Kara E Geisel
*Assistant Examiner* — Jarreas C Underwood
(74) *Attorney, Agent, or Firm* — Fitzpatrick, Cella, Harper & Scinto

(57) ABSTRACT

A projection pattern that includes a measurement pattern for measuring a distance to a target object, and a code pattern for identifying the measurement pattern is projected onto the target object. The target object onto which the projection pattern was projected is sensed. On the basis of a relationship between the measurement pattern and the code pattern in the sensed image, the projection pattern that is to be projected onto the target object after the projection pattern are changed, the code pattern is read out in the sensed image of the target object onto which the changed projection pattern was projected, and the measurement pattern is associated with it. Using the associated measurement pattern, a distance from the projection unit or the sensing unit to the target object is acquired.

21 Claims, 11 Drawing Sheets

| 1 | 3 | 2 | 1 | 1 | 2 |
|---|---|---|---|---|---|
| 2 | 2 | 2 | 3 | 1 | 3 |
| 1 | 3 | 3 | 1 | 1 | 2 |
| 1 | 1 | 2 | 3 | 2 | 2 |
| 3 | 2 | 2 | 1 | 3 | 1 |
| 2 | 1 | 1 | 3 | 2 | 3 |

INFORMATION PROCESSING APPARATUS AND INFORMATION PROCESSING METHOD

BACKGROUND OF THE INVENTION

1. Field of the Invention

The present invention relate to a three-dimensional shape measurement technology.

2. Description of the Related Art

Three-dimensional shape measurement apparatuses that measure a three-dimensional shape of a target object have been widely used in various fields, such as component inspection in factories in the industrial field, and measurement of the shape of living organisms in the medical field. In particular, non-contact measurement methods are effective when a target object is liable to be deformed and damaged due to contact with an apparatus.

Various methods have been proposed as three-dimensional shape measurement methods. The types of three-dimensional shape measurement method are broadly classified into a passive type in which shape measurement is performed only by using a sensing apparatus but without using a projection apparatus, and an active type in which shape measurement is performed by using a sensing apparatus in combination with a projection apparatus. The active type has a higher robustness with respect to measurement objects than the passive type, and is capable of distance measurement with higher accuracy. Also, in the active type, even when there is little information on the surface texture of the measurement object, it is possible to perform shape measurement, gathering hints from projected patterns. Representative examples of the active type include measurement methods based on positions of projected patterns, measurement methods based on changes in phase information, and measurement methods based on information on defocusing of projected patterns.

Among these methods, a light-section method is known, which is a measurement suitable for dynamic scenes and in which a plurality of slit patterns are projected. In the light-section method in which a plurality of slit patterns are projected, all of the slit patterns to be projected have generally the same shape. Therefore, it is difficult to uniquely associate sensed slits with projected slits, unless for example a range of measurement distances is limited.

In this regard, Japanese Patent Laid-Open No. 2009-517634 discloses a method in which a plurality of slits that are encoded according to periodic changes in their widths are projected onto a measurement object. Codes are extracted from sensed slits and the extracted codes of the sensed slits are compared with codes of the projected slits. Then, according to the comparison result, the sensed slits are associated with the projected slits. Further, according to the association results, three-dimensional measurement is performed based on the principle of triangulation.

In the above-described configuration, however, when slits are adjacent to each other with a narrow gap, the adjacent slits may overlap with each other due to arrangement of codes arranged on the slits and blurring caused by an optical system of a projection apparatus, bringing about a problem of reducing a measurement accuracy.

SUMMARY OF THE INVENTION

The present invention has been accomplished in view of such a conventional problem, and provides a technique for improving the accuracy of three-dimensional shape measurement using structured slit patterns.

According to the first aspect of the present invention, there is provided an information processing apparatus comprising: a projection unit configured to project, onto a target object, a projection pattern that includes a measurement pattern for measuring a distance to the target object, and a code pattern for identifying the measurement pattern; a sensing unit configured to sense the target object onto which the projection pattern was projected; a change unit configured to change the projection pattern that is to be projected after the projection pattern onto the target object, on the basis of a relationship between the measurement pattern and the code pattern in a sensed image that was sensed by the sensing unit; an association unit configured to read out the code pattern in the sensed image of the target object onto which the projection pattern changed by the change unit was projected, and to associate the measurement pattern with the code pattern; and an acquisition unit configured to acquire, using the associated measurement pattern, a distance from the projection unit or the sensing unit to the target object.

According to the second aspect of the present invention, there is provided an information processing apparatus comprising: a projection unit configured to project, onto a target object, a projection pattern that includes a measurement pattern for measuring a distance to the target object, and a code pattern for identifying the measurement pattern; a sensing unit configured to sense the target object onto which the projection pattern was projected; an association unit configured to read out the code pattern in a sensed image that was sensed by the sensing unit, and to associate the measurement pattern with the code pattern; an acquisition unit configured to acquire, using the associated measurement pattern, distances from the projection unit or the sensing unit to measurement points on the target object; and a change unit configured to change the projection pattern that is to be projected after the projection pattern onto the target object, on the basis of an area of continuous surface of the target object on which the measurement points for which the acquisition unit acquires the distances are arranged.

According to the third aspect of the present invention, there is provided an information processing method comprising: a projecting step of projecting, onto a target object, a projection pattern that includes a measurement pattern for measuring a distance to the target object, and a code pattern for identifying the measurement pattern, the projecting step being performed by a projection unit; a sensing step of sensing the target object onto which the projection pattern was projected, the sensing step being performed by a sensing unit; a changing step of changing the projection pattern that is to be projected after the projection pattern onto the target object, on the basis of a relationship between the measurement pattern and the code pattern in a sensed image that was sensed by the sensing unit; an associating step of reading out the code pattern in the sensed image of the target object onto which the projection pattern changed in the changing step was projected, and associating the measurement pattern with the code pattern; and an acquiring step of acquiring, using the associated measurement pattern, a distance from the projection unit or the sensing unit to the target object.

According to the fourth aspect of the present invention, there is provided an information processing method comprising: a projecting step of projecting, onto a target object, a projection pattern that includes a measurement pattern for measuring a distance to the target object, and a code pattern for identifying the measurement pattern, the projecting step being performed by a projection unit; a sensing step of sensing the target object onto which the projection pattern was projected, the sensing step being performed by a sensing unit;

an associating step of reading out the code pattern in the sensed image sensed by the sensing unit, and associating the measurement pattern with the code pattern; an acquiring step of acquiring, using the associated measurement pattern, distances from the projection unit or the sensing unit to measurement points on the target object; and a changing step of changing the projection pattern that is to be projected after the projection pattern onto the target object, on the basis of an area of continuous surface of the target object on which the measurement points for which the distances are acquired in the acquisition step are arranged.

Further features of the present invention will become apparent from the following description of exemplary embodiments with reference to the attached drawings.

DESCRIPTION OF THE EMBODIMENTS

The following is a description of embodiments of the present invention with reference to the attached drawings. Note that the embodiments that will be described below are examples when the present invention is specifically implemented, and specific examples of a configuration according to the claims.

First Embodiment

An example of a configuration of a three-dimensional shape measurement apparatus according to the present embodiment will first be described with reference to the block diagram in FIG. 1. The three-dimensional shape measurement apparatus includes a projection portion 1 for projecting a projection pattern image onto a target object 4, a sensing portion 2 for sensing an image of the target object 4 onto which the projection pattern image was projected, and an information processing apparatus 3 for controlling operation of the projection portion 1 and the sensing portion 2, and calculating (measuring) the three-dimensional shape of the target object 4.

The projection portion 1 will now be described. A light source 11 is a light emitting element of any of various types, such as a halogen lamp or an LED. An illumination optical system 12 is an optical system that has the functionality of guiding light emitted from the light source 11 to a display element 13. The display element 13 has the functionality of further guiding the light guided from the illumination optical system 12 to a projection optical system 14, while spatially controlling transmittance or reflectance of the light. The projection optical system 14 is an optical system that is configured to image the light guided from the display element 13 on a specific position of the target object 4.

The sensing portion 2 will now be described. A sensing lens 21 is an optical system that is configured to image, on an image sensor 22, the specific position of the target object 4. The image sensor 22 is a photoelectric conversion element of any of various types, such as a CMOS sensor or a CCD sensor. The location and orientation of the sensing portion 2 are adjusted so that a y-axis in an image coordinate system on the image sensor 22 is parallel to a straight line defined by the two optical axis center positions of the projection portion 1 and the sensing portion 2.

The information processing apparatus 3 will now be described. A projection code sequence generation portion 31 generates a two-dimensional array (code sequence) that is constituted by integers as components, as illustrated in FIG. 2. The projection pattern image (projection image) that is projected onto the target object 4 is constituted by measurement patterns and code patterns that are to be associated with the measurement patterns, as will be described in detail later. The code sequence is constituted by the code patterns that are located in positions in the projection image. The code sequence is a sequence that shows, as codes, the positions of the code patterns located in positions in the projection image. The code sequence of FIG. 2 shows that a pattern that corresponds to code "3", a pattern that corresponds to code "3", a pattern that corresponds to code "1", and the like are arranged in order from the left edge of the uppermost line of the projection image. A method for generating this code sequence will be described later. Then, the projection code sequence generation portion 31 transmits the generated code sequence to a projection pattern image generation portion 33.

A projection pattern luminance determination portion 32 reads out a projection pattern image that is stored in a parameter storage portion 37, and transmits the projection pattern image to the projection pattern image generation portion 33. Further, the projection pattern luminance determination portion 32 adjusts luminance of the projection pattern image stored in the parameter storage portion 37, if needed. This luminance adjustment will be described later.

Figure 3A:
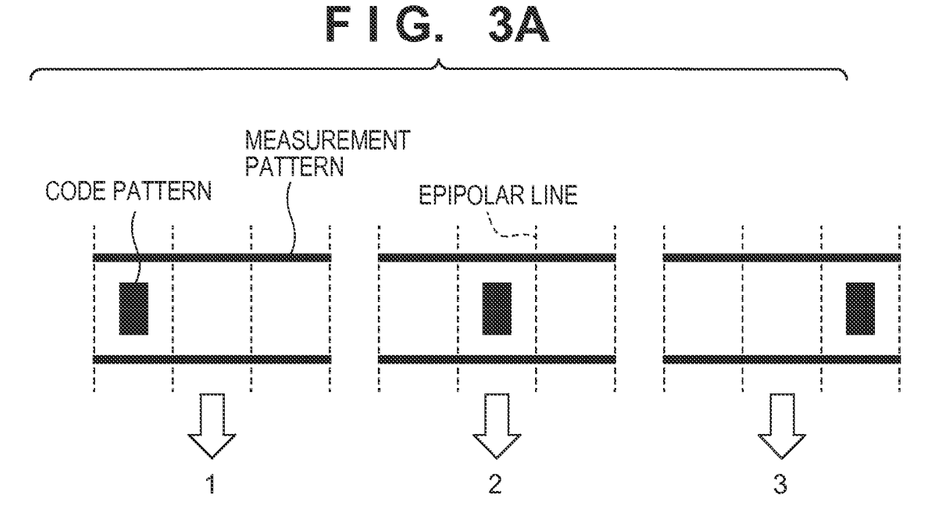
FIGS. 3A and 3B are diagrams illustrating measurement patterns and code patterns.

The projection pattern image generation portion 33 generates, as a projection pattern image, an image obtained by replacing the codes in the code sequence received from the projection code sequence generation portion 31 with patterns that correspond to the codes. For example, as illustrated in FIG. 3A, regions that are each separated by epipolar lines and measurement patterns are classified into three regions, and a ternary code is assigned to each region. For example, a region on which a code pattern is at the left side is associated with code "1", a region on which a code pattern is at the center is associated with code "2", and a region on which a code pattern is at the right side is associated with code "3".

Figure 3B:
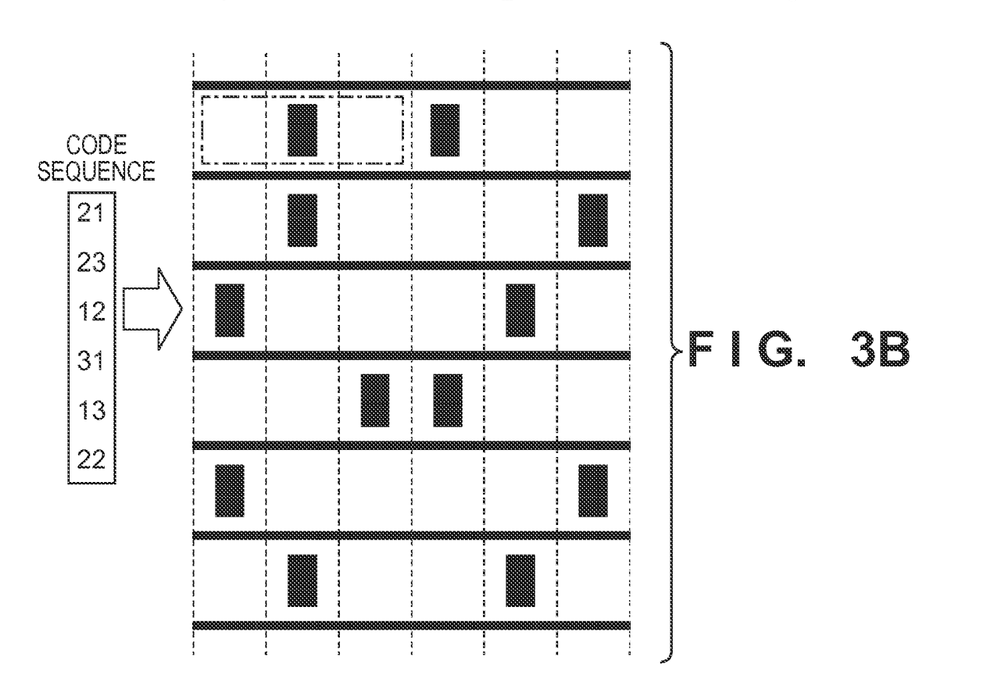

And, as illustrated in FIG. 3B, when the codes "2" and "1" are arranged in this order from the left edge in the uppermost line of the code sequence, code patterns that correspond to the codes "2" and "1" are assigned in that order from the left edge of the uppermost line of the projection image (see the right side in FIG. 3B). Also in the second and following lines, the code patterns corresponding to the codes are assigned in a similar manner, thereby making it possible to generate an image according to the code sequence.

Note that the shape of a code pattern is not limited to a rectangle, and may also be a circle or a triangle. It is also possible to associate code patterns to codes not on the basis of the assignment of regions but on the shape and orientation of the pattern itself.

Then, the projection pattern image generation portion 33 outputs the projection image that was generated in this manner to the projection portion 1 via a general interface for display, such as a DVI (Digital Visual Interface).

A sensed image acquisition portion 34 captures a sensed image as a digital image signal that was sampled and quantized by the sensing portion 2 and stores, in the parameter storage portion 37, the sensed image that was captured. Also, the sensed image acquisition portion 34 controls operation of the sensing portion 2 (such as timing of the sensing) via a general communication interface, such as RS232C and IEEE488.

A sensed code sequence identification portion 35 extracts code patterns that were projected on the target object 4 from the sensed image captured by the sensed image acquisition portion 34, and acquires the corresponding code of the code pattern, as a sensed code sequence, based on a positional relationship of the regions separated by epipolar lines and measurement patterns.

From a partial code sequence that indicates a unique deciding feature in the code sequence, a three-dimensional distance calculation portion 36 associates the projection image with the measured pattern of the sensed image. Further, the three-dimensional distance calculation portion 36 calculates, using the association results, distance information indicating the distance between the sensing portion 2 and the target object 4 onto which the projection image was projected, that is, the shape of the target object 4, on the basis of the principle of triangulation. A calculation method of shape measurement based on triangulation will be described later.

A parameter storage portion 37 stores parameters that are required for calculation of three-dimensional distance, and distance information. The parameters include instrument parameters of the projection portion 1 and the sensing portion 2, internal parameters of the projection portion 1 and the sensing portion 2, and external parameters of the projection portion 1 and the sensing portion 2. "Instrument parameters" refers to the numbers of pixels of the display element 13 and of the image sensor 22. "Internal parameters of the projection portion 1 and the sensing portion 2" refers to focal lengths, image centers, coefficients of image deformation due to distortion, and the like. "External parameters of the projection portion 1 and the sensing portion 2" refers to a translation matrix and a rotation matrix that indicate the relative positional relationship between the projection portion 1 and the sensing portion 2.

The following is a description of a method for generating a code sequence performed by the projection code sequence generation portion 31. A code sequence is a two-dimensional array in which codes are arranged in u and v directions (see FIG. 2), and are encoded in accordance with a rule that will be described later. The present embodiment selects one de Bruijn sequence in each of the u and v directions, that is, two de Bruijn sequences in two directions (vertical and lateral directions) in total.

A de Bruijn sequence is a sequence having period l in which, referring successive m-factors, each pattern appears only once in the period. As to the selection of de Bruijn sequences, a de Bruijn sequence of $l_u = k^m$ is selected for the u direction, and a de Bruijn sequence of $l_v = k^n$ is selected for the v direction, where k is the number of symbols that can be used as a projection image, and the size of a rectangle that encloses a sampled shape is defined as $m \times (n+1)$. In the present embodiment, k=3 since the number of the symbols is 3. Further, m=3 and n=2, since the shapes of all partial code sequences are enclosed by a rectangle of 3×3. The de Bruijn sequence that is used in the u direction of the present embodiment, where k=3 and m=3 (sequence length: $3^3=27$), is expressed as follows:

$$\text{Vhm} = 331321311231221211133232223 \quad (1)$$

Similarly, the de Bruijn sequence that is used in the v direction of the present embodiment, where k=3 and n=2 (sequence length: $3^2=9$), is expressed as follows:

$$\text{Vvm} = 312113223 \quad (2)$$

The following is a description of a method for generating a code sequence using the above-described two de Bruijn sequences. In a code sequence $f_{ij}$ that is to be generated, defining i as the first row in the u direction, the de Bruijn sequence in the u direction is first used as it is (see Formula 3).

$$f_{ij} = \text{Vhm}_j \quad (3)$$

The code sequence $f_{ij}$ in the second and further lines in the u direction is expressed by the following formula (4).

$$f_{ij} = 1 + (f_{i-1,j} + \text{Vvm}_j) \bmod k \quad (4)$$

The code sequence is a result obtained by first adding the de Bruijn sequence in the u direction to one row before. The result of the addition is expressed with a k-adic number represented by 1 to k, in which any carry is ignored. As described above, by adding all the de Bruijn sequences in the u direction, column by column, so as to obtain a code sequence, it is possible to generate a two-dimensional code sequence as illustrated in FIG. 2, that extends in the u and v directions.

Figure 4:
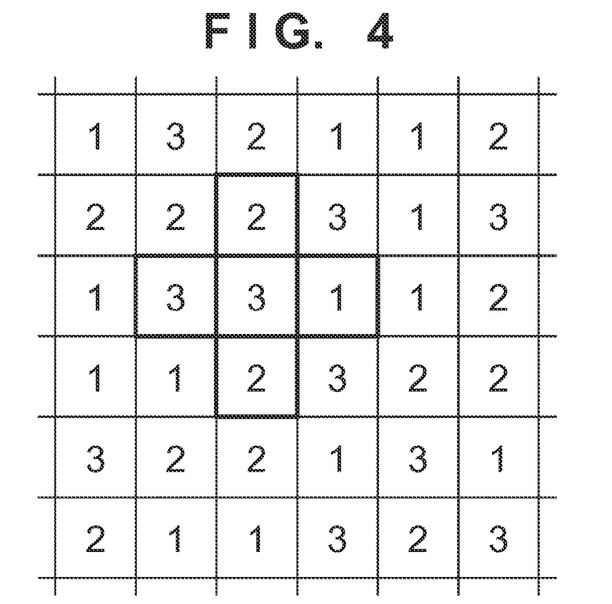
FIG. 4 is a diagram illustrating a method to generate a code sequence.

As illustrated in FIG. 4, the code sequence generated by the above-described method includes, within any region enclosed by a rectangle that has the size of m×n and is located at any position, only one partial code sequence that has lengths of m and n sampled in order expressed in Formula (5) in which a given raw and a given column are fixed. Here, i and j indicate coordinates of the code sampling.

$$\text{code order: } w_{ij}, w_{i,j-1}, w_{i-1,j}, w_{ij+1}, w_{i+1,j} \quad (5)$$

Here, Formula (5) is premised on an order where the sampling shape is a cross shape as illustrated in FIG. 4. It is also possible to change the sampling shape in accordance with the length to be sampled, and to sample in an arbitrary order. Further, although De Bruijn sequences are used as code sequences in the present embodiment, it is also possible to use pseudorandom sequences, such as M-sequences, in which a partial code sequence that was arbitrarily selected is uniquely determined with respect to another partial code sequence.

Figure 5:
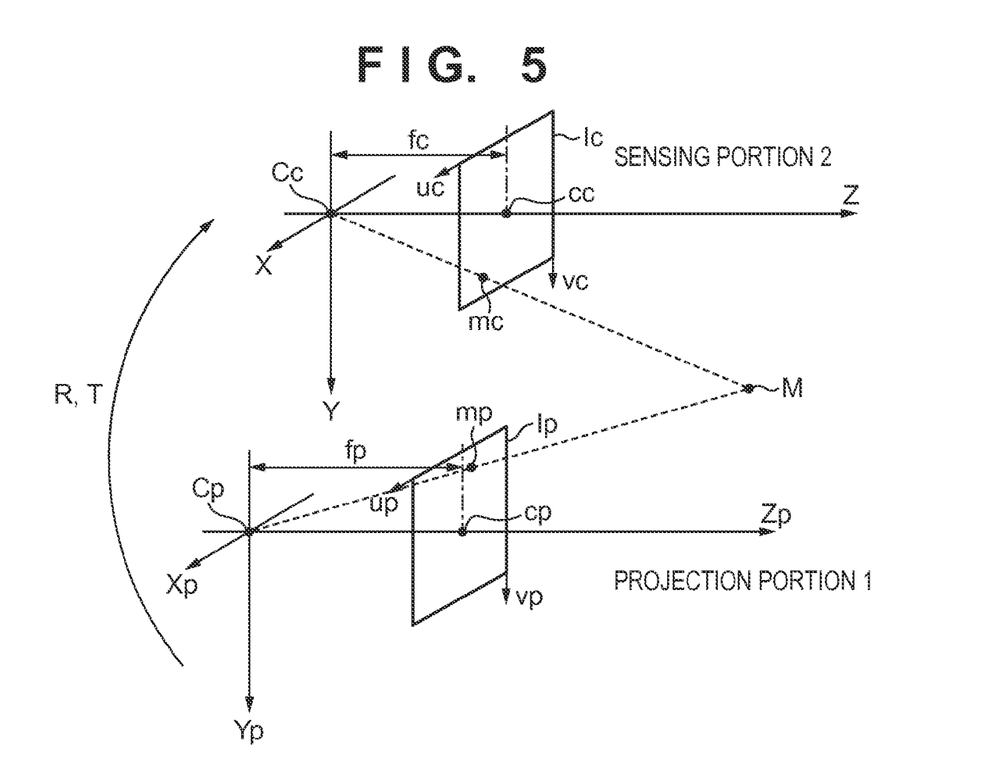
FIG. 5 is a diagram illustrating the principle of distance measurement using a triangulation method.

The following is a description of the principle of distance measurement using triangulation method performed by the three-dimensional distance calculation portion 36, with reference to FIG. 5. Provided that an optical center of the sensing portion 2 is Cc, an image plane is Ic, a focal length is fc, a pixel coordinate of the image center cc is (uco, vco), and a pixel size of the image sensor 22 is Psc, then an internal matrix Ac of the sensing portion 2 is expressed by the following Formula (6):

$$Ac = \begin{bmatrix} fc/Psc & 0 & uco \\ 0 & fc/Psc & vco \\ 0 & 0 & 1 \end{bmatrix} \quad (6)$$

Further, provided that an optical center of the projection portion 1 is Cp, an image plane is Ip, a focal length is fp, a pixel coordinate of the image center cp is (upo, vpo), and a pixel size of the display element 13 is Psp, then an internal matrix Ap of the projection portion 1 is expressed by the following formula (7).

$$Ap = \begin{bmatrix} fp/Psp & 0 & upo \\ 0 & fp/Psp & vpo \\ 0 & 0 & 1 \end{bmatrix} \quad (7)$$

Note that the internal matrix Ac of the sensing portion 2 and the internal matrix Ap of the projection portion 1 are calculated by using a method for calibrating internal parameters, which is a well-known technology.

The external parameters, which indicate the relative positional relationship between a camera coordinate system XYZ of the sensing portion 2 and a camera coordinate system XpYpZp of the projection portion 1, are the rotation matrix R and the translation matrix T. The rotation matrix R is a matrix of 3×3, and the translation matrix T is a matrix of 3×1. The R and T are calculated by using a method for calibrating external parameters, which is a well-known technology.

Provided that a coordinate of a point M in a three-dimensional space is (X, Y, Z) where the camera coordinate system of the sensing portion 2 is defined as the origin, and pixel coordinates of a point mc where the point M is projected onto the image plane Ic of the sensing portion 2 are (uc, vc), then a correspondence relationship thereof is expressed by the following Formula (8):

$$s\begin{bmatrix} uc \\ vc \\ 1 \end{bmatrix} = [Ac \ 0] \begin{bmatrix} X \\ Y \\ Z \\ 1 \end{bmatrix} \quad (8)$$

$$= \begin{bmatrix} C_{11} & C_{12} & C_{13} & C_{14} \\ C_{21} & C_{22} & C_{23} & C_{24} \\ C_{31} & C_{32} & C_{33} & C_{34} \end{bmatrix} \begin{bmatrix} X \\ Y \\ Z \\ 1 \end{bmatrix}$$

In the formula, s is a scalar. Also, the pixel coordinates of a point mp where the same point M is projected onto the image plane Ip of the projection portion 1 are defined as (up, vp). A correspondence relationship thereof is expressed by the following Formula (9).

$$s'\begin{bmatrix} up \\ vp \\ 1 \end{bmatrix} = \begin{bmatrix} R & T \\ 0 & 1 \end{bmatrix} [Ap \ 0] \begin{bmatrix} X \\ Y \\ Z \\ 1 \end{bmatrix} \quad (9)$$

$$= \begin{bmatrix} P_{11} & P_{12} & P_{13} & P_{14} \\ P_{21} & P_{22} & P_{23} & P_{24} \\ P_{31} & P_{32} & P_{33} & P_{34} \end{bmatrix} \begin{bmatrix} X \\ Y \\ Z \\ 1 \end{bmatrix}$$

In this formula, s' is a scalar. By developing the above-described Formulae (8) and (9), four simultaneous equations as expressed by the following Formula (10) are generated.

Formula 10

$$(C_{11}-C_{31}uc)X+(C_{12}-C_{32}uc)Y+(C_{13}-C_{33}uc)Z=C_{34}uc-C_{14}$$

$$(C_{21}-C_{31}vc)X+(C_{22}-C_{32}vc)Y+(C_{23}-C_{33}vc)Z=C_{34}vc-C_{24}$$

$$(P_{11}-P_{31}up)X+(P_{12}-P_{32}up)Y+(P_{13}-P_{33}up)Z=P_{34}up-P_{14}$$

$$(P_{21}-P_{31}vp)X+(P_{22}-P_{32}vp)Y+(P_{23}-P_{33}vp)Z=P_{34}vp-P_{24} \quad (10)$$

The pixel coordinates (uc, vc) of the point mc and the pixel coordinates (up, vp) of the point mp are determined by using a pattern projection method such as a space encoding method. Further, $C_{ij}$ (i=1 to 3, j=1 to 3) and $P_{ij}$ (i=1 to 3, j=1 to 3) are determined by a calibration method in advance since they can be calculated from the internal matrices and the external parameters. In formula (9), only the coordinate values (X, Y, Z) of the point M are unknown, and they can be determined by solving the simultaneous equations. Further, since there are three unknown coordinate values to be determined, which are (X, Y, Z) of the point M, the coordinate values of the point M can be calculated if any one of the pixel coordinate values (up, vp) of the projection portion 1 is determined.

Figure 6:
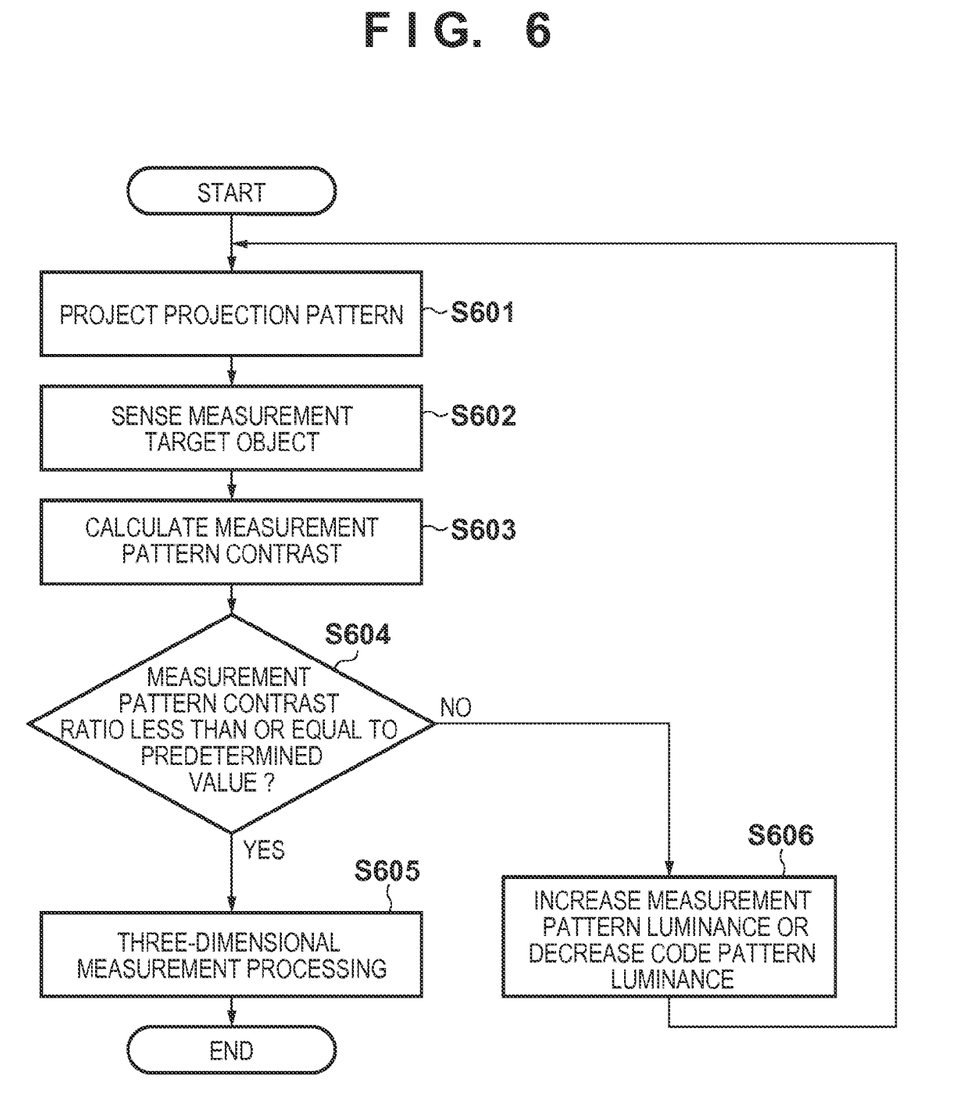
FIG. 6 is a flowchart illustrating processing performed by an information processing apparatus 3.

The following is a description of processing performed by the information processing apparatus 3, with reference to a flowchart of the processing illustrated in FIG. 6. Since some steps have already been described above, those steps are described only briefly.

In step S601, the projection pattern luminance determination portion 32, the projection code sequence generation portion 31 and the projection pattern image generation portion 33 generate a projection image by performing the above-described processing. Then, the projection pattern image generation portion 33 transmits the generated projection image to the projection portion 1. Accordingly, the projection portion 1 projects this projection image onto the target object 4.

In step S602, the sensed image acquisition portion 34 acquires, from the sensing portion 2, a sensed image of the target object 4 onto which the projection image was projected and stores, in the parameter storage portion 37, the sensed image that was acquired.

In step S603, the projection pattern luminance determination portion 32 first reads out the sensed image that was stored in the parameter storage portion 37 in step S602. Then, the projection pattern luminance determination portion 32 scans the sensed image that was read out line by line (for example, line by line in the shorter side direction of the measurement pattern), and collects the luminance distribution in which the luminance values of the pixels from one edge to another edge of each line are arranged.

Figure 7:
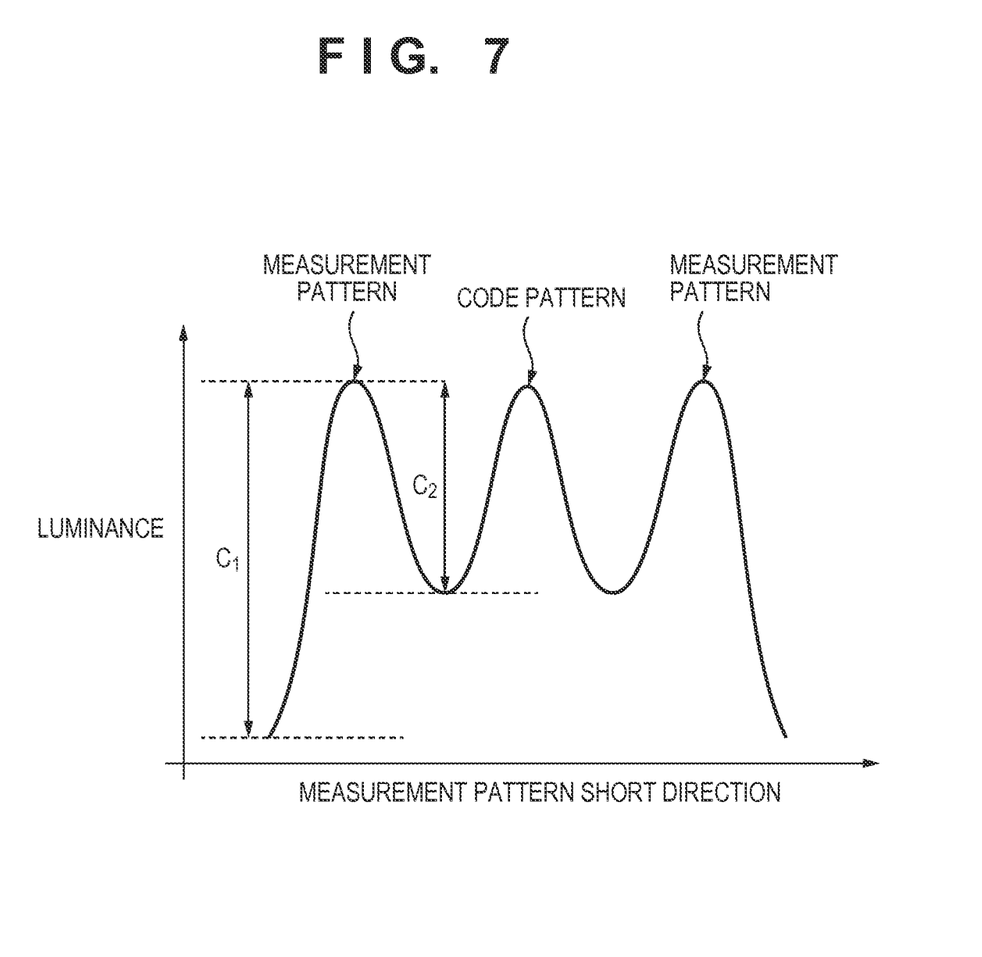
FIG. 7 is a diagram illustrating luminance distribution in an interval in a given line.

A luminance distribution in an interval in a given line is illustrated in FIG. 7. In FIG. 7, the horizontal axis denotes locations of the pixels in an interval in a given line, and the vertical axis denotes the luminance values of the pixels in the pixel locations. As illustrated in FIG. 7, the luminance distribution in the line shows that pixels located closer to the pixel locations of the pixels constituting the measurement patterns and the code pattern have higher luminance values.

Further, the projection pattern luminance determination portion 32 acquires C1 and C2 for the luminance distribution in each line (first calculation and second calculation). C1 denotes a difference between the maximum luminance value and the minimum luminance value in a luminance distribution. C2 is obtained by specifying, for each group of pixels that are ranged between two pixels each having a local maximum luminance value in the luminance distribution, the minimum luminance value from luminance values within the group, and further specifying the minimum luminance value from the minimum luminance values that were specified for the respective groups of pixels. Then, the projection pattern luminance determination portion 32 calculates, for each line, a ratio of the difference C1 to the luminance value C2 (C1/C2) that were acquired for the line.

Then, if the number of lines in which the ratio (C1/C2) does not exceed a predetermined value is greater than or equal to a predetermined number of lines, then the procedure advances to step S605 via step S604. On the other hand, if the number of lines in which the ratio (C1/C2) exceeds a predetermined value is greater than or equal to a predetermined number of lines, then the procedure advances to step S606 via step S604. Note that various conditions are conceivable as conditions for the conditional branching in the step S604. For example, it is also possible that, if all lines are lines in which the ratio (C1/C2) does not exceed a predetermined value, then the procedure advances to step S605, and if there is at least one line in which ratio (C1/C2) exceeds a predetermined value, then the procedure advances to step S606.

In step S605, the three-dimensional distance calculation portion 36 associates the sensed image that was stored in the parameter storage portion 37 in step S602 with the projection image that was projected onto the target object 4, and calculates (measures), using the principle of triangulation, the three-dimensional shape of the target object 4.

In step S606, the projection pattern luminance determination portion 32 subjects the projection pattern image (the projection pattern used for generation of the projection image) stored in the parameter storage portion 37 to the following change processing. That is, the projection pattern luminance determination portion 32 adjusts the measurement patterns and/or the code patterns in the projection pattern image stored in the parameter storage portion 37 so that the luminance values of the measurement patterns in the sensed image are relatively higher than the luminance values of the code patterns in the sensed image.

In this adjustment, a change processing is performed that is selected from change processing in which only the luminance values of the measurement patterns are increased, change processing in which only the luminance values of the code patterns are decreased, and change processing in which only the luminance values of the measurement patterns are increased and only the luminance values of the code patterns are decreased. For example, it is possible to perform the adjustment so that the above-described C1 and C2 approach the same value as possible. Further, the same adjustment can be applied to all the measurement patterns and the code patterns. Different adjustment can be applied for each of the measurement/code patterns.

Then, the procedure returns to step S601, and in step S601, the projection pattern luminance determination portion 32, the projection code sequence generation portion 31, and the projection pattern image generation portion 33 complete the projection image using such measurement/code patterns in which luminance values were changed. And then in step S602, the sensed image acquisition portion 34 acquires, from the sensing portion 2, the sensed image of the target object 4 onto which the projection image was projected, the projection image being constituted by such measurement/code patterns in which luminance values were changed, and stores, in the parameter storage portion 37, the sensed image that was acquired. After this step, the procedure advances as described above.

Note that, although the projection pattern image according to the present embodiment is constituted by line patterns having two types of orientations, that is, the measurement patterns and the code patterns as illustrated in FIGS. 3A and 3B, the projection pattern image may be constituted by line patterns having two or more types of orientations. In this case, it is possible to extract, by performing filter processing using Sobel filters corresponding to the respective orientations, only line patterns that have the same orientation. With this measure, deformation of an object can be measured in more detail.

Further, although the ratio (C1/C2) is used for the condition of the conditional branching in step S604, any condition that shows a difference between C1 and C2 may be used and, for example, Formula (11) may be used that shows ambiguity of the pattern locations when performing the filter processing using Sobel filters.

$$P = \frac{n}{C_1 + C_2} \tag{11}$$

Here, n denotes a sum of noises that affect an image sensor, such as dark-current noise, shot noise, read noise, texture noise of an object, and the like. The luminance values of the measurement patterns may be improved so that the sum of noises remains within a predetermined target accuracy range. Alternatively, the same can apply to the code patterns. The luminance values of the code patterns can be decreased when assigning codes so that p is smaller regarding the section range, and the determination may be performed using Formula (11).

By changing the relative luminance between the measurement patterns and the code patterns on the basis of the sensed image as in the present embodiment, an offset of positions of the measurement patterns is reduced and a contrast in the measurement lines is relatively improved, making an improvement in measurement accuracy possible.

Second Embodiment

The present embodiment differs from the first embodiment in the conditions for the luminance change performed by the projection pattern luminance determination portion 32. The following describes only the difference between the present embodiment and the first embodiment, and features other than the following description are equivalent to those of the first embodiment.

Figure 8:
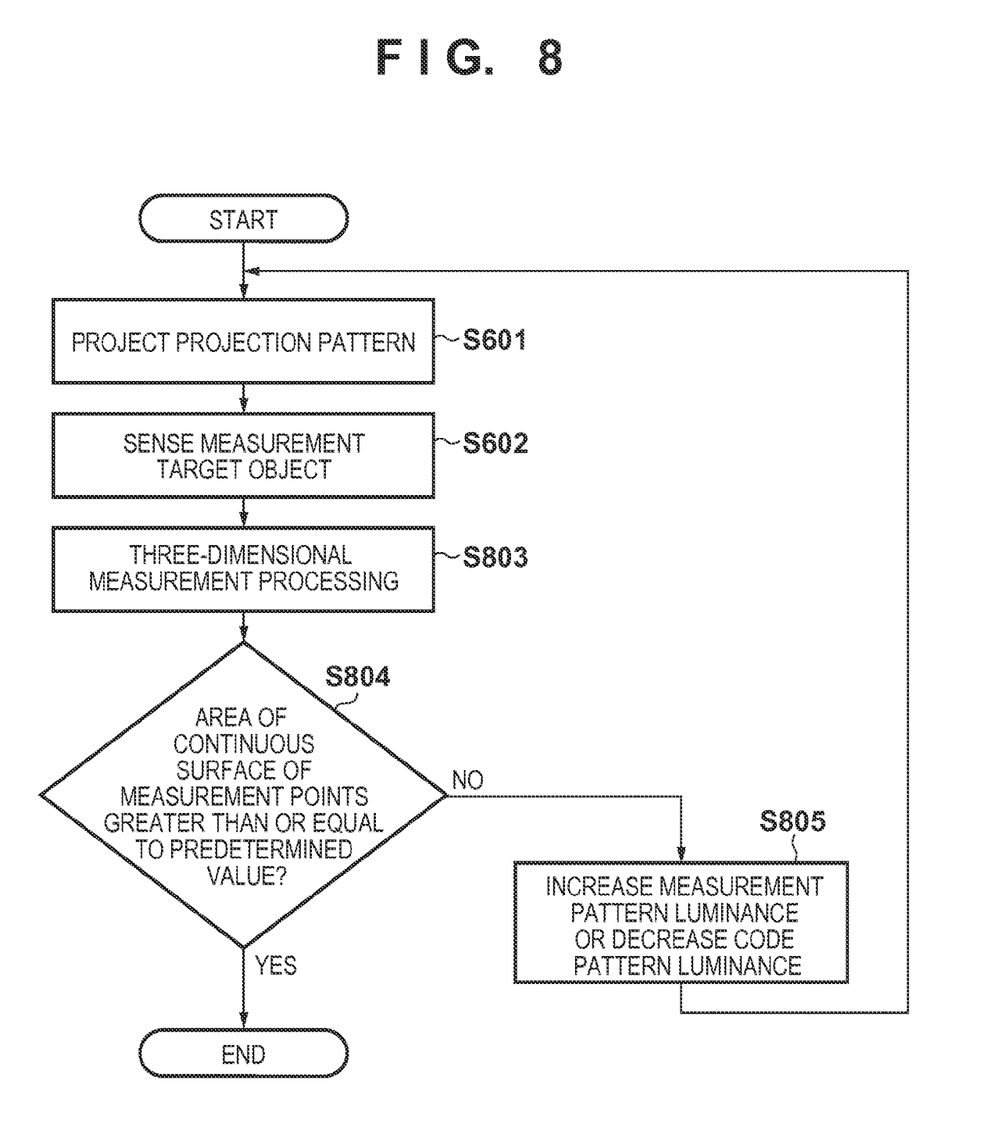
FIG. 8 is a flowchart illustrating processing performed by the information processing apparatus 3.

Processing performed by the information processing apparatus 3 according to the present embodiment is described with reference to a flowchart of the processing illustrated in FIG. 8. In FIG. 8, the same step numbers as those in FIG. 6 are assigned to steps equivalent to those in FIG. 6, and their further description is omitted.

In step S803, the three-dimensional distance calculation portion 36 associates the sensed image that was stored in the parameter storage portion 37 in step S602 with the projection image that was projected on the target object 4, and calculates (measures) the three-dimensional shape of the target object 4 by using the principle of triangulation.

In step S804, the projection pattern luminance determination portion 32 determines whether or not an area of continuous surfaces of the measurement points obtained in the three-dimensional measurement processing in step S803 is greater than or equal to a predetermined value. If the determination result shows that the area is greater than or equal to the predetermined value, then the processing according to the flowchart of FIG. 8 ends, and if the determination result shows that the area is less than the predetermined value, then the procedure advances to step S805.

In step S805, the projection pattern luminance determination portion 32 performs processing for increasing the luminance values of the measurement patterns and/or for decreasing the luminance values of the code patterns, in order to reduce influence of blurring on the measurement patterns and to increase the number of the measurement points as much as possible. This processing is the same as that in the first embodiment.

By changing the relative luminance between the measurement patterns and the code patterns on the basis of distance information as in the present embodiment, an offset of positions of the measurement patterns is reduced and a contrast in the measurement lines is relatively improved, making an improvement in measurement accuracy possible.

Third Embodiment

Figure 9:
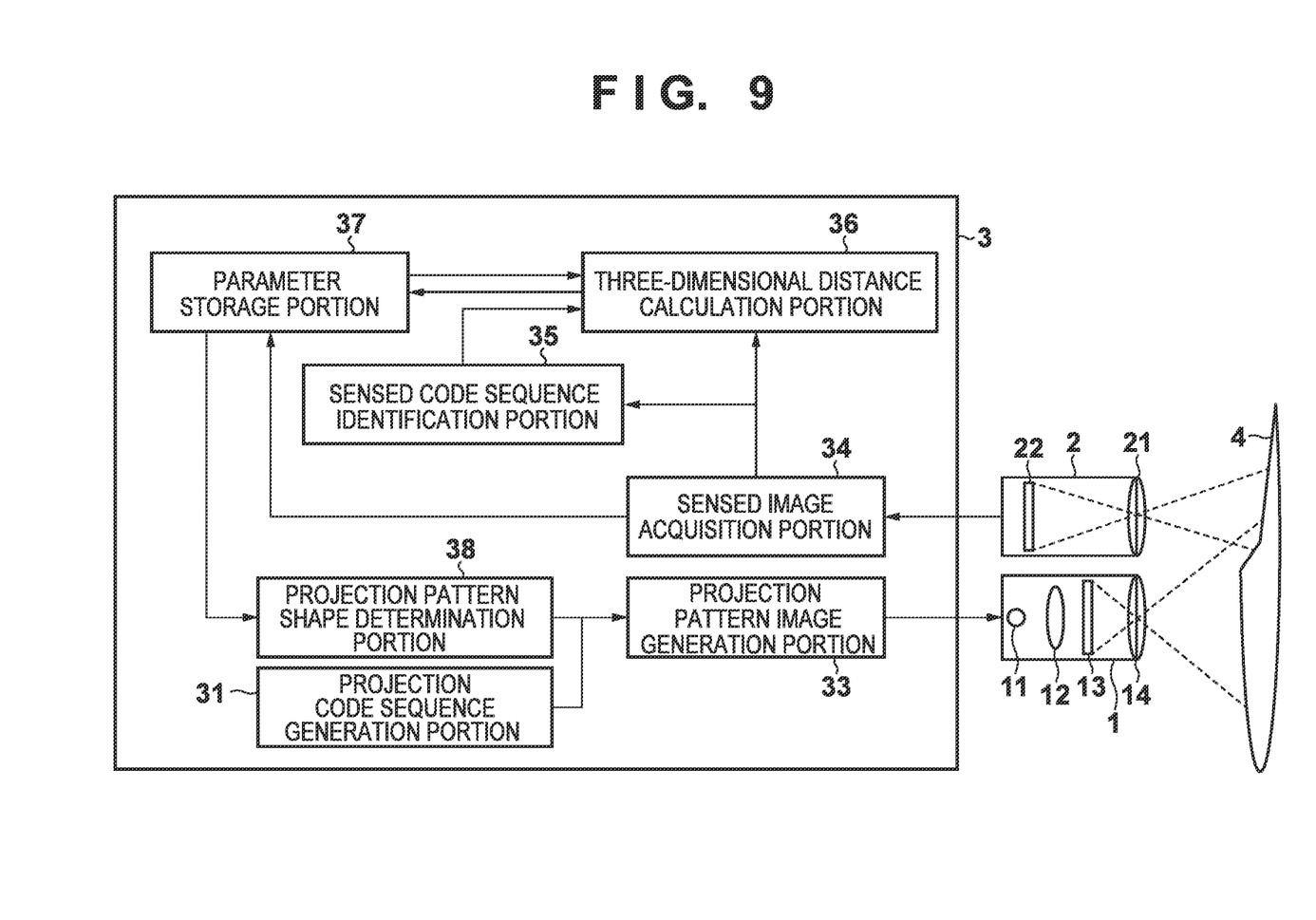
FIG. 9 is a block diagram illustrating an example of a configuration of a three-dimensional shape measurement apparatus.

The following will first describe, with reference to a block diagram of FIG. 9, an example of a configuration of a three-dimensional shape measurement apparatus according to the present embodiment. In FIG. 9, the same reference numbers as those in FIG. 1 are assigned to components equivalent to those in FIG. 1, and their further description is omitted.

Figure 1:
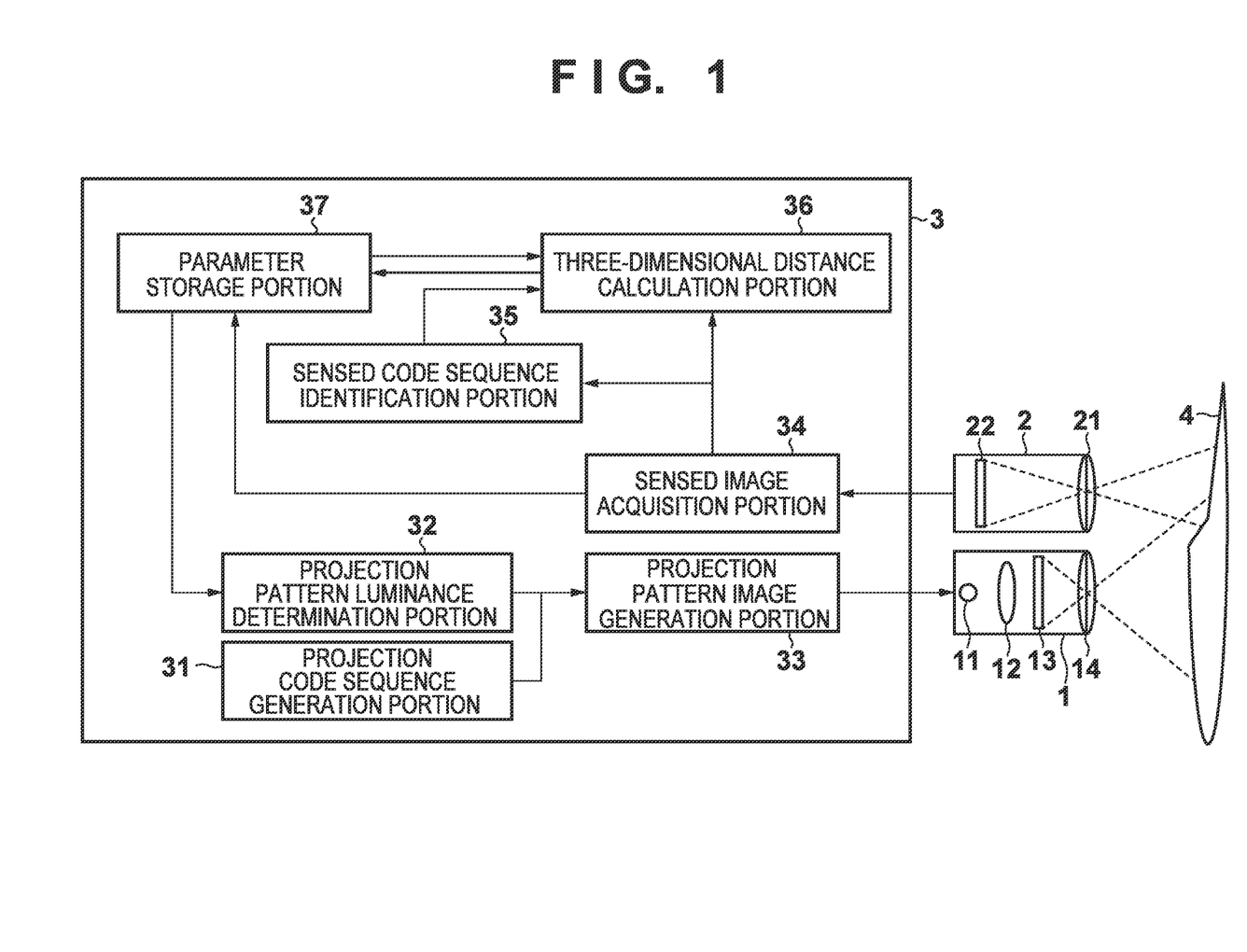
FIG. 1 is a block diagram illustrating an example of a configuration of a three-dimensional shape measurement apparatus.
Figure 2:
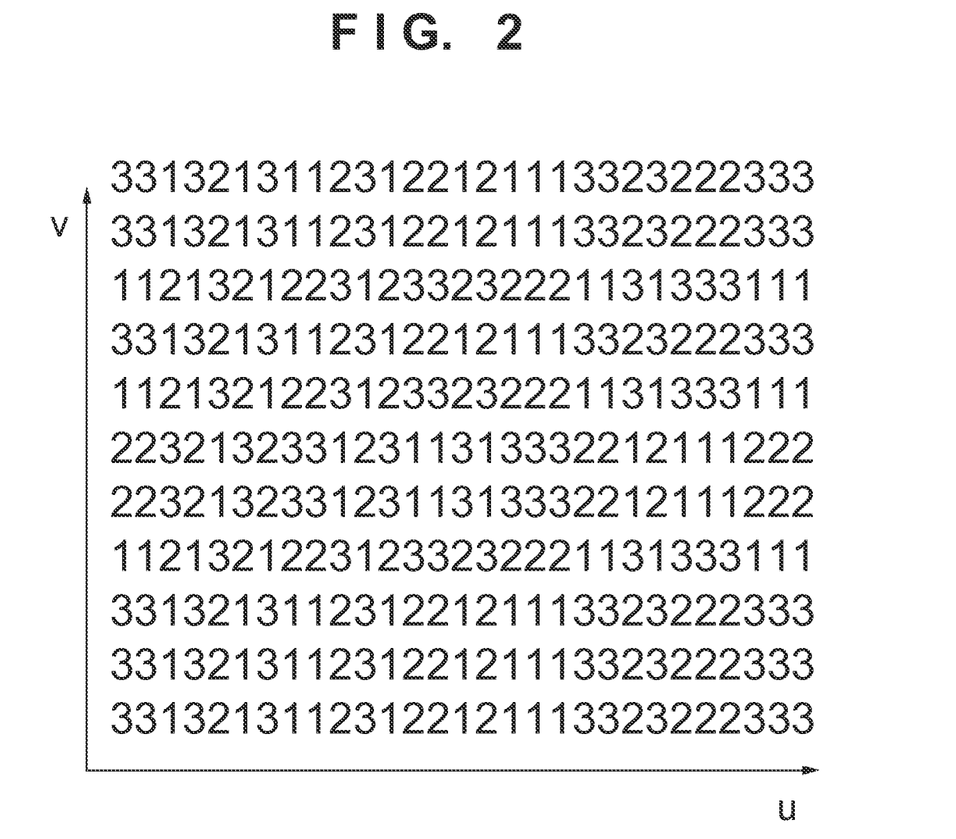
FIG. 2 is a diagram illustrating an example of a configuration of a two-dimensional array.

FIG. 9 illustrates a configuration in which the projection pattern luminance determination portion 32 of FIG. 1 is replaced by a projection pattern shape determination portion 38. Similarly to the projection pattern luminance determination portion 32, the projection pattern shape determination portion 38 transmits measurement/code patterns stored in the parameter storage portion 37 to the projection pattern image generation portion 33. Also, the projection pattern shape determination portion 38 adaptively changes, on the basis of luminance of the measurement patterns in the sensed image, shapes of the measurement patterns and the code patterns that are to be output to the projection portion 1, so that the patterns do not affect each other.

Figure 10:
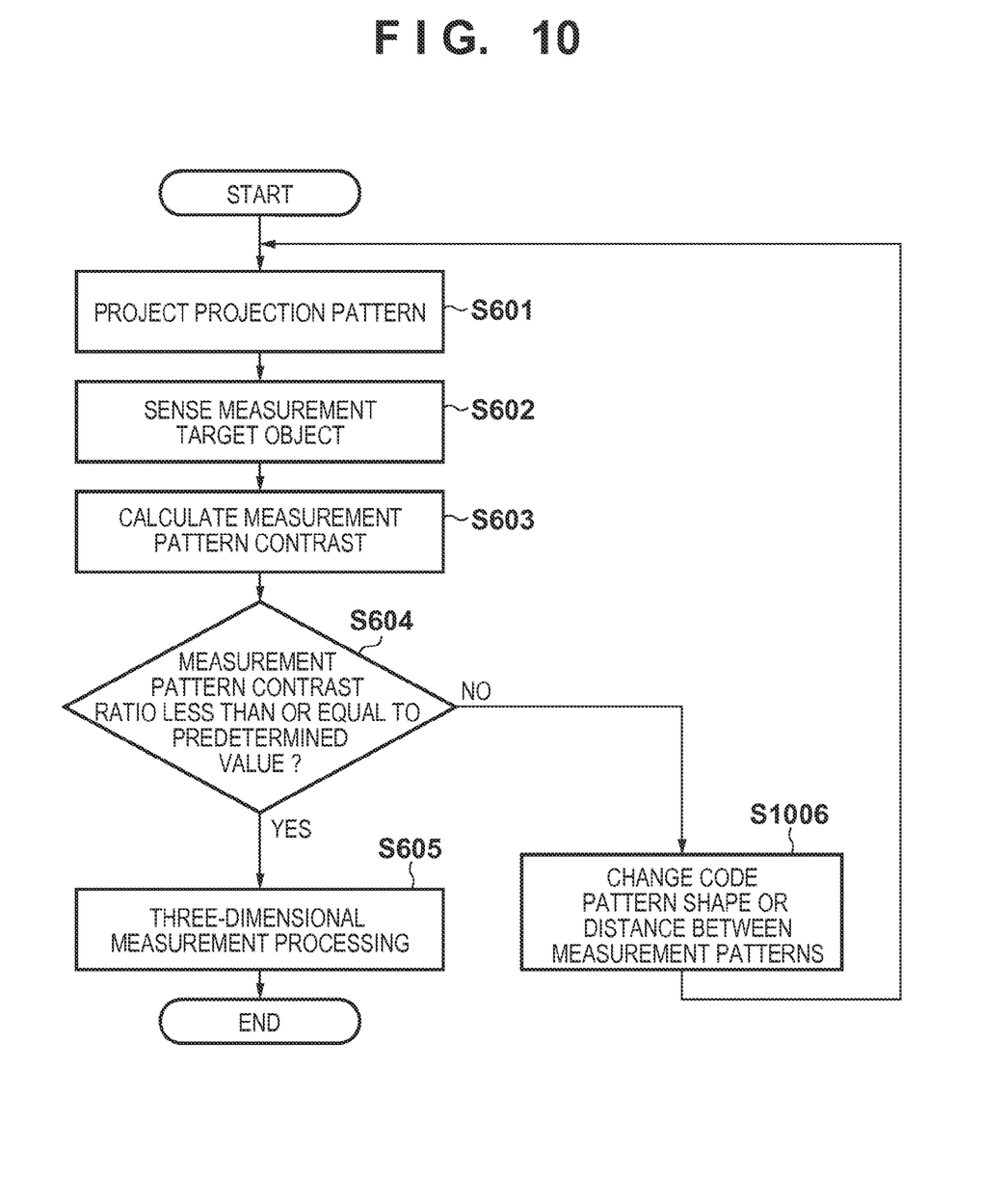
FIG. 10 is a flowchart illustrating processing performed by an information processing apparatus 3.

Processing performed by the information processing apparatus 3 of the present embodiment is described with reference to a flowchart of the processing illustrated in FIG. 10. In FIG. 10, the same step numbers as those in FIG. 6 are assigned to steps equivalent to those in FIG. 6, and their further description is omitted. Note that, regarding step S603, the present embodiment is similar to the first embodiment, except that the processing of step S603 is performed by the projection pattern shape determination portion 38.

If the number of lines in which the ratio (C1/C2) does not exceed a predetermined value is greater than or equal to a predetermined number of lines, then the procedure advances to step S605 via step S604. On the other hand, if the number of lines in which the ratio (C1/C2) exceeds a predetermined value is greater than or equal to a predetermined number of lines, then the procedure advances to step S1006 via step S604.

In step S1006, the projection pattern shape determination portion 38 performs a change in shape of the code patterns (including change in size thereof) in the projection pattern image (the projection pattern image that was used for the generation of the projection image) stored in the parameter storage portion 37, and a change in measurement patterns. For example, it is possible to perform the change in shape of the code patterns (this includes changes in size thereof) and the change in measurement patterns so that the above-described C1 and C2 approach the same value as possible. Different change process can be applied for each of the code patterns.

Figure 11A:
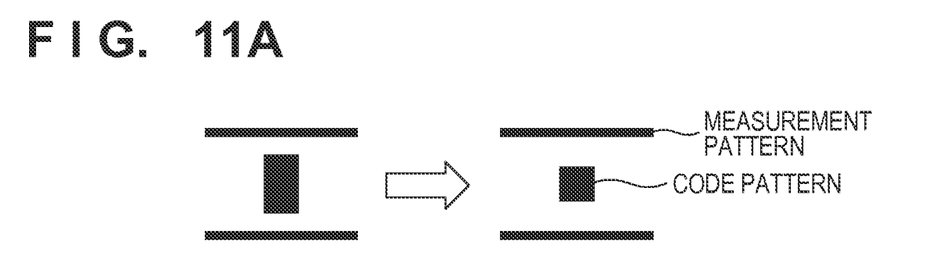
FIGS. 11A to 11C are diagrams illustrating examples of processing in step S1006.
Figure 11B:
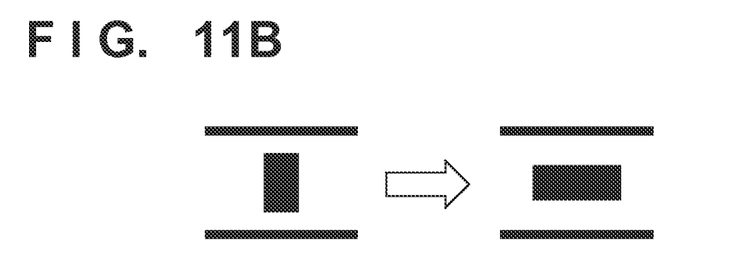
Figure 11C:
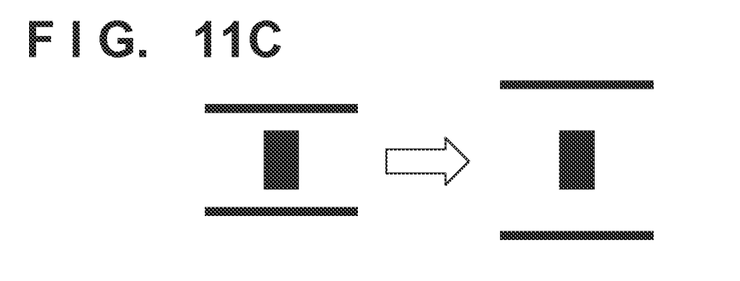

For example, in the method illustrated in FIG. 11A, the size of a code pattern in the longitudinal direction is reduced so that the code pattern does not overlap with a measurement pattern due to blurring. And, in a method illustrated in FIG. 11B, the size relationship of a code pattern in the longitudinal direction and in the direction perpendicular thereto is inverted, in order to prevent a reduction in luminance of the code pattern in the sensed image. Also, in the method illustrated in FIG. 11C, a distance between measurement patterns is made long.

By changing the shape of patterns on the basis of the sensed image as in the present embodiment, an offset of positions of the measurement patterns is reduced and a contrast in the measurement lines is relatively improved, making an improvement in measurement accuracy possible.

Fourth Embodiment

The present embodiment differs from the third embodiment with respect to the conditions for the change performed by the projection pattern shape determination portion 38. The following describes only the difference between the present embodiment and the third embodiment, and features other than the following description are equivalent to those of the third embodiment.

Figure 12:
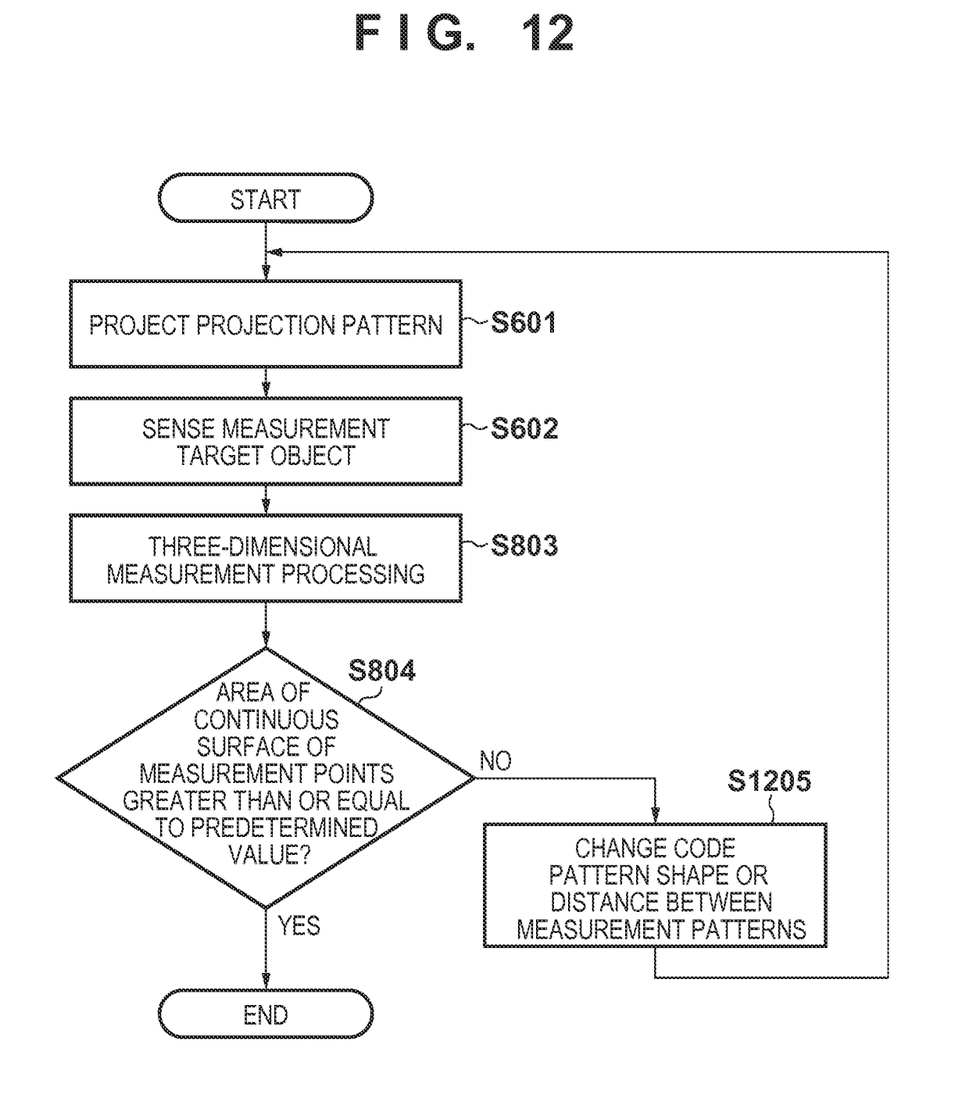
FIG. 12 is a flowchart illustrating processing performed by the information processing apparatus 3.

Processing performed by the information processing apparatus 3 according to the present embodiment is described with reference to a flowchart of the processing illustrated in FIG. 12. In FIG. 12, the same step numbers as those in FIGS. 6 and 8 are assigned to steps equivalent to those in FIGS. 6 and 8, and their further description is omitted. Note that, regarding step S804, the present embodiment is similar to the second embodiment, except that the processing of step S804 is performed by the projection pattern shape determination portion 38.

In step S1205, the projection pattern shape determination portion 38 performs a change in shape of the code patterns (this includes changes in size thereof) in the projection pattern, and a change in measurement patterns, in order to reduce the influence of blurring on the measurement patterns and to increase the number of the measurement points as much as possible. This processing is the same as that in the third embodiment.

By changing the shape of the patterns on the basis of the distance information as in the present embodiment, an offset of positions of the measurement patterns is reduced and a contrast in the measurement lines is relatively improved, making an improvement in measurement accuracy possible.

Note that although various embodiments have been described as the first to fourth embodiments, every embodiment is merely an example of a configuration that will be described below, and another embodiment is also included in the scope of the present invention if it is based on the below configuration.

That is, a code pattern for uniquely deciding a measurement pattern is generated, the measurement pattern being a pattern for measuring the shape of a target object (projection code generation). Then, a projection pattern image that is constituted by the measurement pattern and the code pattern is generated (projection pattern image generation) and projected, and the target object onto which the projection pattern image was projected is sensed in a direction differing from the projection direction. Then, the code pattern is read out from the sensed image that was sensed, to identify the measurement pattern (sensed code identification). Subsequently, the code pattern in the projection pattern image are associated with the code pattern in the sensed image that was sensed and, using the associated measurement pattern, the shape of the target object is calculated on the basis of the principle of triangulation (three-dimensional distance calculation). Ultimately, according to prior information, the measurement pattern and/or the code pattern are adaptively changed (pattern deciding unit). Note that the prior information refers to information based on previous measurement results.

Fifth Embodiment

The portions that constitute the information processing apparatus 3 may be configured by software, and specifically the portions other than the parameter storage portion 37 may be configured by software (a computer program). In this case, by a processor such as a CPU that is included in the information processing apparatus 3 executing the computer program, the functionalities of the portion that correspond to the computer program are realized.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-048610 filed Mar. 5, 2012, which is hereby incorporated by reference herein in its entirety.

What is claimed is:

1. An information processing apparatus comprising:
a projection unit configured to project, onto a target object, a projection pattern that includes a measurement pattern for measuring a distance to the target object, and a code pattern for identifying the measurement pattern;
a sensing unit configured to sense the target object onto which the projection pattern has been projected;
a change unit configured to determine a changed projection pattern as a determined projection pattern to be projected thereafter, on the basis of a relationship between the measurement pattern and the code pattern in a sensed image that has been sensed by the sensing unit;
an identification unit configured to read out the code pattern in a sensed image of the target object onto which the determined projection pattern by the change unit has been projected, and to identify the measurement pattern in the determined projection pattern in the sensed image of the target object onto which the determined projection pattern has been projected, based on the read out code pattern; and
an acquisition unit configured to acquire, using the identified measurement pattern, a distance from the projection unit or the sensing unit to the target object.

2. The information processing apparatus according to claim 1, wherein the change unit is configured to change luminance values of the measurement pattern and/or luminance values of the code pattern in the projection pattern, such that the measurement pattern and the code pattern in the sensed image sensed by the sensing unit do not overlap with each other.

3. The information processing apparatus according to claim 1, wherein the change unit is configured to change a shape of the measurement pattern and/or the code pattern in the projection pattern, on the basis of a relationship between luminance values of the measurement pattern and luminance values of the code pattern in the sensed image sensed by the sensing unit.

4. The information processing apparatus according to claim 1, wherein the change unit is configured to change a luminance value of the measurement pattern and/or the code pattern in the projection pattern, on the basis of a relationship between the measurement pattern and the code pattern in the sensed image sensed by the sensing unit.

5. The information processing apparatus according to claim 1, wherein the change unit is configured to change a shape of the measurement pattern and/or the code pattern in the projection pattern, on the basis of a relationship between the measurement pattern and the code pattern in the sensed image sensed by the sensing unit.

6. An information processing apparatus comprising:
a projection unit configured to project, onto a target object, a projection pattern that includes a measurement pattern for measuring a distance to the target object, and a code pattern for identifying the measurement pattern;
a sensing unit configured to sense the target object onto which the projection pattern has been projected;
an identification unit configured to read out the code pattern in a sensed image that has been sensed by the sensing unit, and to identify the measurement pattern of the projection pattern in the sensed image based on the read out code pattern;
an acquisition unit configured to acquire, using the identified measurement pattern, distances from the projection unit or the sensing unit to measurement points on the target object; and
a change unit configured to change the projection pattern to determine a changed projection pattern as a projection pattern to be projected thereafter, on the basis of an area of continuous surface of the target object on which the measurement points for which the acquisition unit acquires the distances are arranged.

7. The information processing apparatus according to claim 6, wherein the change unit is configured to change a shape of the measurement pattern and/or the code pattern in the projection pattern on the basis of the area of the continuous surface.

8. The information processing apparatus according to claim 6, wherein the change unit is configured to change a luminance value of the measurement pattern and/or the code pattern in the projection pattern on the basis of the area of the continuous surface.

9. An information processing method comprising:
a projecting step of projecting, onto a target object, a projection pattern that includes a measurement pattern for measuring a distance to the target object, and a code pattern for identifying the measurement pattern, the projecting step being performed by a projection unit;
a sensing step of sensing the target object onto which the projection pattern has been projected, the sensing step being performed by a sensing unit;
a changing step of determining a changed projection pattern as a determined projection pattern to be projected thereafter, on the basis of a relationship between the measurement pattern and the code pattern in a sensed image that has been sensed by the sensing unit;
an identifying step of reading out the code pattern in a sensed image of the target object onto which the projection pattern determined in the changing step has been projected, and identifying the measurement pattern with the code pattern; and an acquiring step of acquiring, using the identified measurement pattern, a distance from the projection unit or the sensing unit to the target object.

10. An information processing method comprising:
a projecting step of projecting, onto a target object, a projection pattern that includes a measurement pattern for measuring a distance to the target object, and a code pattern for identifying the measurement pattern, the projecting step being performed by a projection unit;
a sensing step of sensing the target object onto which the projection pattern has been projected, the sensing step being performed by a sensing unit;
an identifying step of reading out the code pattern in the sensed image sensed by the sensing unit, and identifying the measurement pattern with the code pattern;
an acquiring step of acquiring, using the identified measurement pattern, distances from the projection unit or the sensing unit to measurement points on the target object; and
a changing step of determining a changed projection pattern as a determined projection pattern to be projected thereafter, on the basis of an area of continuous surface of the target object on which the measurement points for which the distances are acquired in the acquisition step are arranged.

11. A non-transitory computer-readable storage medium which stores a program for causing a computer to execute the steps of an information processing method according to claim 9.

12. A non-transitory computer-readable storage medium which stores a program for causing a computer to execute the steps of an information processing method according to claim 11.

13. The information processing apparatus according to claim 1, wherein the change unit is configured to change a shape of the measurement pattern and/or the code pattern in the projection pattern, such that the measurement pattern and the code pattern in the sensed image sensed by the sensing unit do not overlap with each other.

14. The apparatus according to claim 1, wherein the identification identifies the measurement pattern of the determined projection pattern in the sensed image by associating the measurement pattern in the determined projection pattern in the sensed image with the measurement pattern in the determined projection pattern, using the read out code pattern.

15. The apparatus according to claim 6, wherein the identification identifies the measurement pattern of the projection pattern in the sensed image by associating the measurement pattern in the projection pattern in the sensed image with the measurement pattern in the projection pattern, using the read out code pattern.

16. An information processing apparatus comprising:
a projection unit configured to project, onto a target object, a projection pattern that includes a plurality of measurement patterns for measuring a distance to the target object;
a sensing unit configured to sense the target object onto which the projection pattern has been projected;
a determination unit configured to determine a next projection pattern including a plurality of measurement patterns, to be projected next, by changing a width among the plurality of measurement patterns of the projection pattern based on a sensed image of the target object onto which the projection pattern has been projected, in a case that the plurality of measurement patterns of the projection pattern in the sensed image satisfies a predetermined condition;
an identification unit configured to identify each measurement pattern in the next projection pattern in a sensed image of the target object onto which the next projection pattern has been projected; and
an acquisition unit configured to acquire, using each identified measurement pattern, a distance from the projection unit or the sensing unit to the target object.

17. The information processing apparatus according to claim 16, wherein the determination unit is configured to determine the next projection pattern by changing the width among the plurality of measurement patterns of the projection pattern so that the measurement patterns in a sensed image of the target object onto which the next projection pattern has been projected do not overlap with each other.

18. The information processing apparatus according to claim 16, wherein the determination unit is configured to determine the next projection pattern by changing the width among the plurality of measurement patterns of the projection pattern so that the width among the measurement patterns is broader.

19. The information processing apparatus according to claim 16, wherein the predetermined condition is a condition where the measurement patterns in a sensed image of the target object onto which the projection pattern has been projected overlap with each other.

20. An information processing method comprising:
projecting, onto a target object, a projection pattern that includes a plurality of measurement patterns for measuring a distance to the target object with a projection unit;
sensing, with a sensing unit, the target object onto which the projection pattern has been projected;
determining a next projection pattern including a plurality of measurement patterns, to be projected next, by changing a width among the plurality of measurement patterns of the projection pattern based on a sensed image of the target object onto which the projection pattern has been projected in case that the plurality of measurement patterns of the projection pattern in the sensed image satisfies a predetermined condition;
identifying each measurement pattern in the next projection pattern in a sensed image of the target object onto which the next projection pattern has been projected; and
acquiring, using each identified measurement pattern, a distance from the projection unit or the sensing unit to the target object.

21. A non-transitory computer-readable storage medium which stores a program for causing a computer to execute the steps of an information processing method according to claim 20.

* * * * *